United States Patent
Enyedi et al.

(10) Patent No.: US 10,324,868 B2
(45) Date of Patent: Jun. 18, 2019

(54) COUNTER WITH REDUCED MEMORY ACCESS

(71) Applicant: Telefonaktiebolaget LM Ericsson (publ), Stockholm (SE)

(72) Inventors: Gabor Sandor Enyedi, Budapest (HU); László Molnár, Budapest (HU); Gergely Pongrácz, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/751,745

(22) PCT Filed: Aug. 24, 2015

(86) PCT No.: PCT/EP2015/069310
§ 371 (c)(1),
(2) Date: Feb. 9, 2018

(87) PCT Pub. No.: WO2017/032401
PCT Pub. Date: Mar. 2, 2017

(65) Prior Publication Data
US 2018/0232327 A1    Aug. 16, 2018

(51) Int. Cl.
*G06F 13/16* (2006.01)
*H04L 12/26* (2006.01)
*H04L 12/801* (2013.01)

(52) U.S. Cl.
CPC ........ *G06F 13/1668* (2013.01); *H04L 43/022* (2013.01); *H04L 43/0894* (2013.01); *H04L 47/12* (2013.01)

(58) Field of Classification Search
CPC ............... H04L 43/022; H04L 43/0894; G06F 13/1668
See application file for complete search history.

(56) References Cited

U.S. PATENT DOCUMENTS

| | | | | |
|---|---|---|---|---|
| 2010/0332652 | A1* | 12/2010 | Bhattacharya | H04L 41/069 709/224 |
| 2013/0185343 | A1 | 7/2013 | Arad et al. | |
| 2014/0328196 | A1 | 11/2014 | Arad et al. | |

OTHER PUBLICATIONS

Choi, Baek-Young et al., "On the Accuracy and Overhead of Cisco Sampled NetFlow", Sprint ATL Research Report, Jul. 31, 2004, pp. 1-11.

* cited by examiner

*Primary Examiner* — Glenn A. Auve
(74) *Attorney, Agent, or Firm* — Murphy, Bilak & Homiller, PLLC (57) ABSTRACT

The invention relates to a counting unit (100) configured to count an amount of traffic events of a data packet traffic. The counting unit comprises a counting element (131) configured to store a value representing the amount of traffic events. The counting unit further comprises a processing unit (120-123) configured to detect an arrival of each data packet of the data packet traffic at the processing unit, to process each data packet and to determine whether the value at counting element (131) should be increased each time the arrival of one data packet is detected at the processing unit, wherein the processing unit (120-123) is configured to store a probability value $p_c<1$ indicating a probability that the processing unit increases the value at the counting element each time the arrival of one data packet is detected at the processing unit, wherein the processing unit is configured such that when it detects the arrival of one data packet at the processing unit, it increases the value at the counting element only with the probability $p_c$.

21 Claims, 4 Drawing Sheets

COUNTER WITH REDUCED MEMORY ACCESS

TECHNICAL FIELD

The present invention relates to a counting unit configured to count an amount of traffic events for data packet traffic and to the corresponding method. Furthermore, a system comprising a plurality of counting units, a computer program, and a carrier is provided.

BACKGROUND

Counters are essential parts of packet processing devices like routers and switches. Such packet processing devices typically contain several counters such as one counter per port, per routing entry, etc. in order to provide proper usage statistics. The number of counters is even increasing further in Openflow switches, which usually apply counters for tables and meters and where packets can match multiple flow entries in different flow tables, so that each time a counter has to be increased.

Although incrementing a counter does not seem to be difficult task at first glance, it needs a memory read to get the actual value of the counter and a memory write transaction in order to write back the new value. Memory transactions can be sped up seriously by using some cache, but only until the number of counters is not too high. However, a high number of counters is used inter alia in Openflow switches.

Using many counters is a common requirement for modern network devices. Maintaining these counters means a surprisingly high burden for the memory bus and/or cache architecture, which causes memory access speed degradation. Even in the case when there is enough cache to store all the counters, valuable cache space is taken which could be used for other purposes.

SUMMARY

Accordingly, a need exists to reduce the memory or cache transactions during the use of a counter.

This need is met by the features of the independent claims. Further aspects are described in the dependent claims.

According to a first aspect, a counting unit configured to count an amount of traffic events of a data packet traffic is provided, wherein the counting unit comprises a counting element configured to store a value representing the amount of traffic events. The counting unit furthermore comprises a processing unit configured to detect an arrival of each data packet of the data packet traffic at the processing unit and configured to process each data packet and configured to determine whether the value at the counting element should be increased each time the arrival of one data packet is detected at the processing unit. The processing unit is configured to store a probability value $p_c<1$ indicating a probability that the processing unit increases the value at the counting element each time the arrival of one data packet is detected at the processing unit. The processing unit is configured such that when it detects the arrival of one data packet at the processing unit, it increases the value at the counting element only with the probability $p_c$.

The counting unit only updates the value stored in the counting element with a probability $p_c<1$. With a probability of $p_c=1$, each traffic event would be counted and a full precise determination of the amount of traffic events is possible. With a probability value of $p_c<1$, e.g. a value $p_c=0.01$ or $0.05$, the value at the counting element is not updated for each arriving data packet. Thus, the number of memory accesses to the place where the value representing the amount of traffic events is stored is reduced. Nevertheless, it is possible to provide an approximate number of the processed data packets. When the counting unit knows with which probability the value of the counting element is increased, it is possible to estimate the number of traffic events, e.g. the number of data packets or the number of bytes in the packet. This is especially true when the number of data packets is large. This large number of data packets is, however, met in most of the cases when data packet traffic is transmitted over a network, e.g. when the counting unit is implemented in a router or switch in an operator network such as a cellular network.

By way of example, when the processing unit determines to increase the value at the counting element, it may increase the value stored in the counting element by $Y/p_c$ with $Y$ corresponding to the increase of the value at the counting element with $p_c=1$. Thus, if the value were increased by Y at a precise counting unit, the number of traffic events can nevertheless be approximated by increasing the value by $Y/p_c$. In this context, if the number of packets is counted, $Y=1$. If the number of bytes needs to be known, Y may correspond to the number of bytes in the packet.

The invention furthermore relates to a system comprising a plurality of the above-mentioned counting units wherein when the processing unit of one of the counting units detects the arrival of one data packet, it increases the values at the counting elements of all the other counting units with the probability $p_c$.

In this embodiment the counting decision is not done for each counting unit, but for a set of counting units. Here, an arriving packet may increase all the counting units or none of the counting units is increased.

The invention furthermore relates to a method for counting an amount of traffic events of a data packet traffic using a counting unit mentioned above. According to one step, an arrival of each data packet of the data packet traffic is detected at the processing unit. Furthermore, each data packet is processed at the processing unit and it is determined whether the value at the counting element should be increased each time the arrival of one data packet is detected. When the arrival of one data packet is detected at the processing unit, it increases the value at the counting element only with the probability $p_c<1$, with $p_c$ being the probability that the processing unit increases the value at the counting element each time the arrival of a data packet is detected at the processing unit.

Furthermore, a method is provided for operating a system with a plurality of counting units in which the arrival of a data packet is detected at the processing unit of one of the counting units and the values at the counting elements of all the other counting units of the system is increased only with the probability $p_c$.

According to another aspect, a computer program comprising program code to be executed by at least one processing unit of a counting unit is provided, wherein execution of the program code causes the at least one processing unit to execute a method as described above or as described in further detail below.

Furthermore, a carrier comprising the computer program is provided wherein the carrier is one of an electronic signal, optical signal, radio signal or computer readable storage medium.

It is to be understood that the features mentioned above and features yet to be explained below can be used not only in their respective combinations indicated, but also in other combinations or in isolation without departing from the scope of the present invention. The features of the above and below mentioned aspects and embodiments may be combined with each other and other embodiments unless explicitly mentioned otherwise.

BRIEF DESCRIPTION OF THE DRAWINGS

The foregoing and additional features and effects of the application will become apparent from the following detailed description when read in conjunction with the accompanying drawings, in which like reference numerals refer to like elements.

DETAILED DESCRIPTION OF THE EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereafter or by the drawings which are to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or physical or functional units shown in the drawings may also be implemented by an indirect connection or coupling. A coupling between components may be established over a wireless or a wired connection. Functional blocks may be implemented in hardware, firmware, software or a combination thereof.

Hereinafter, techniques are described how the number of memory accesses needed at a counting unit is reduced so that in this way the processing time of a data packet traffic is reduced. The portion of the counted data traffic events is selected randomly using a probability $p_c$ which may be inter alia dynamically selected and which may change with respect to the actual load occurring at the counting unit. In a very simple example, at a given moment roughly every n-th packet is selected. In this case, the counting units will store values about n times lower than they will store normally, so real values can be approximated by multiplying the values in the counters by N.

In the following an approximation mechanism for a counting unit is provided in which the amount of traffic events, it be the number of data packets or the number or bytes sent out at a traffic is approximated instead of using the accurate values. The solution is based on the idea of not counting each of the packets, but only a small fraction of them and to make an approximation based on this fraction. This sampling and approximation can be realized in multiple ways.

Figure 1:
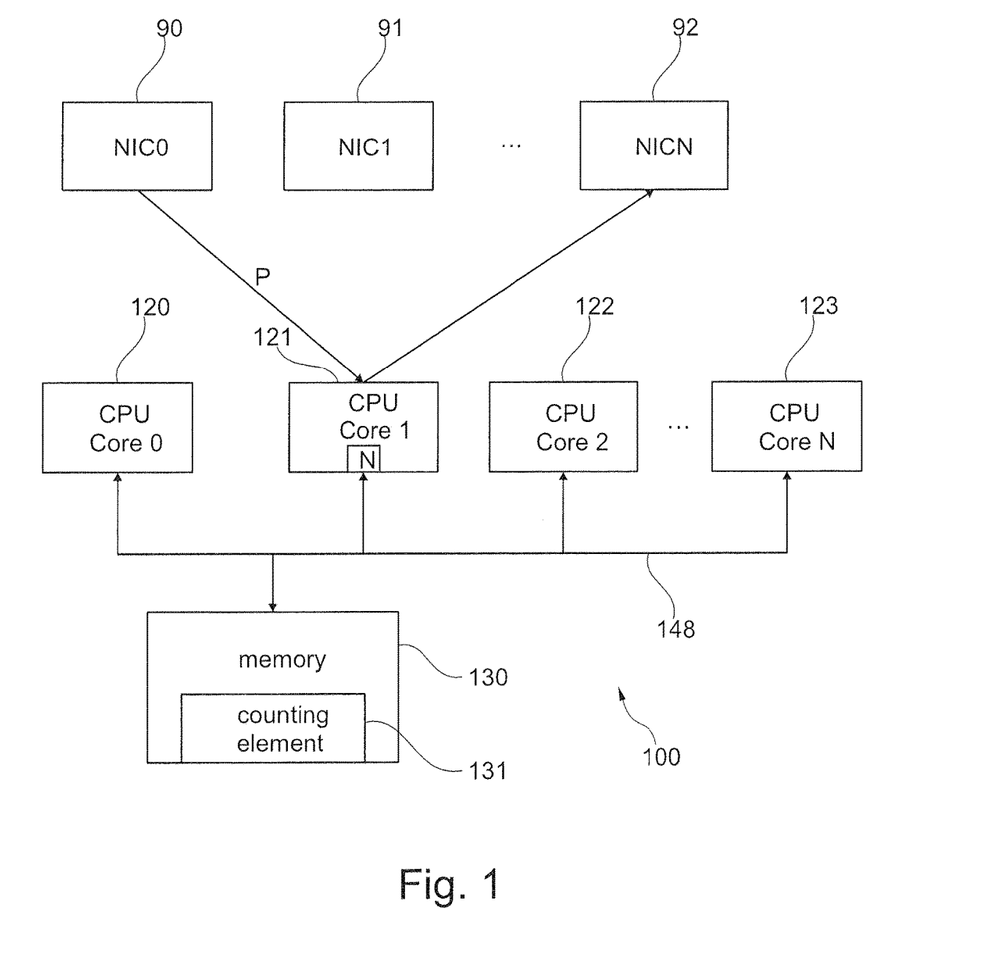
FIG. 1 shows an example architectural view of a counting unit which increases a value stored at a counting element not for all arriving data packets.

In the following different embodiments how this approximation is achieved are discussed. In connection with FIG. 1 a first embodiment will be disclosed. In the embodiment of FIG. 1, a counting unit 100 is shown. The counting unit 100 comprises a plurality of processing units or CPU cores 120-123 in the embodiment shown N CPU cores. The CPU cores 120 to 123 of the unit receive the data packets from one of the networks cards 90 to 92. The embodiment shown CPU 121 receives a data packet from a network interface card 90. The network interface card is capable to assign the packet to one of the CPU cores. The counting unit may have one or several CPUs with each CPU containing one or several CPU cores as shown in FIG. 1. When the packet is received by the processing unit 121, the processing unit generates a random number and stores it in its local memory 121a as shown in FIG. 1. This random number N is stored in the local CPU memory. The processing unit 121 then executes the packet processing When the packet arrives at the node where the processing unit is provided, some part of the packet, typically the header or sometimes some trailer is parsed. Based on the information collected in this way the processing unit decides about the task to do. The processing task can typically include the modification of the packet. Furthermore, the processing may include some counting/logging if needed. Furthermore, the destination is determined to which node the packet is forwarded and this selecting of the right next node based on the parsed information is part of the packet processing too. The processing unit 121 may use a packet processing software code and if the processing unit gets to a point where some counting element 131 of memory 130 should be increased, the processing unit 121 compares the random number with a probability value $p_c$ belonging to the counting element 131. The value of $p_c$ can come from the program code itself when it is constant or it can be stored in some fast local memory of the processing unit, e.g. in some cache, as the value of $p_c$ changes rarely. If processing unit 121 decides that the counting element 131 should be increased, the processing unit 121 reads the value from the memory 130 which can be a random access memory, RAM, increases the value and writes it back to the memory 130. After the processing at the processing unit 121 the packet is sent further through the proper network interface card, in the example shown, it is card N with reference numeral 92. As can be seen from the above, for each increase of the value of the counting element 131 the value has to be read and transported through a transport element, which in the example is a memory bus 140 and has to be transported again through memory bus 140 when the new value is written back into the memory. In the embodiment of FIG. 1, the value of the counting element is stored in the memory such as the RAM, in another embodiment, the value may also be stored temporarily in another memory which can be accessed faster such as the cache. Even though, in this case the value has not to be transmitted through the memory bus 140, but nevertheless some kind of transport element is necessary, e.g. a memory controller in case of a cache. With each counting of a packet, the load at the transport element increases. In total this load can be decreased when not all the traffic events are counted. As can be seen from the above, each counting element 130 can be increased by an arriving packet with a probability $p_c$. When a packet arrives at the processing unit a single random number N is generated. The packet is processed normally, but each time a counter needs to be increased, the random number $p_c$ is used to decide whether it is allowed or not to increase the values stored in the counting element 131. If not, the packet is processed, but the value in the counting element 131 is not increased. Deciding whether the counter can be increased or not can be done in any way, but the probability of increasing counting element 131 is $p_c$. By way of example, if the random number has a uniform distribution between 0 and 99 and $p_c$ is =0.05, the counting element 131 may be increased if the number is e.g. less than 5. It should be understood that any other criterion could be used to check whether a predefined requirement is met or not. Using the example of the numbers given above, the counting element may be also increased when predefined 5 numbers out of the number range 0-99 are met, e.g. numbers like 17, 31, 53, 72 and 89. If the randomly generated number corresponds to one of these numbers, the counting element may be increased.

If it is decided that for an arriving packet the value of the counting element should be increased, the counter may not be increased by Y which corresponds to the value if all the packets are counted, but is increased by $Y/p_c$ in order to get an approximation of the counter traffic events. If the number of data packets should be counted Y=1, if the number of bytes of packets are being counted, Y may correspond to the number of bytes in a data packet. If the number of packets is big enough, this approximation provides an accurate result. Furthermore, the higher the $p_c$ value is set, the more accurate the approximation is. However, the higher the value of $p_c$ is, the higher the load on the transporter element such as the memory bus or the memory controller is. Therefore, it is possible to balance between the precision of the counting elements and the overhead caused by them. By way of example if a fully precise counting element is needed, $p_c$ may be set to 1, if however a roughly precise counting element such a rate limiter is needed, $p_c$ may be set to a value such as 1=0.05 and if a low precision is possible such as for a large number of order of magnitude precise debug counters, $p_c$ may be 0.001.

As mentioned above, the approximation is accurate when the number of packets is high, meaning when the load on the transport element is high enough. The value $p_c$ need not to be fixed at runtime, but may be increased when the load decreases and there is free resource dealing more with the counting elements. When the load is low enough, e.g. below a certain threshold, a counting element may also count with a probability of 1 meaning that all the packets are counted a perfect accuracy. Thus, the processing unit may determine the load on the transport element or memory bus 140 or the memory controller and may adapt $p_c$ accordingly.

The generation of a random number for an arriving packet may be computationally expensive. However, in the present embodiment, an element configured to generate a random number with low computational effort such a linear congruential generator may be used for the randomization of the generated number. Here, in case of the congruential generator one multiplication or addition is enough to generate the next random number.

Figure 2:
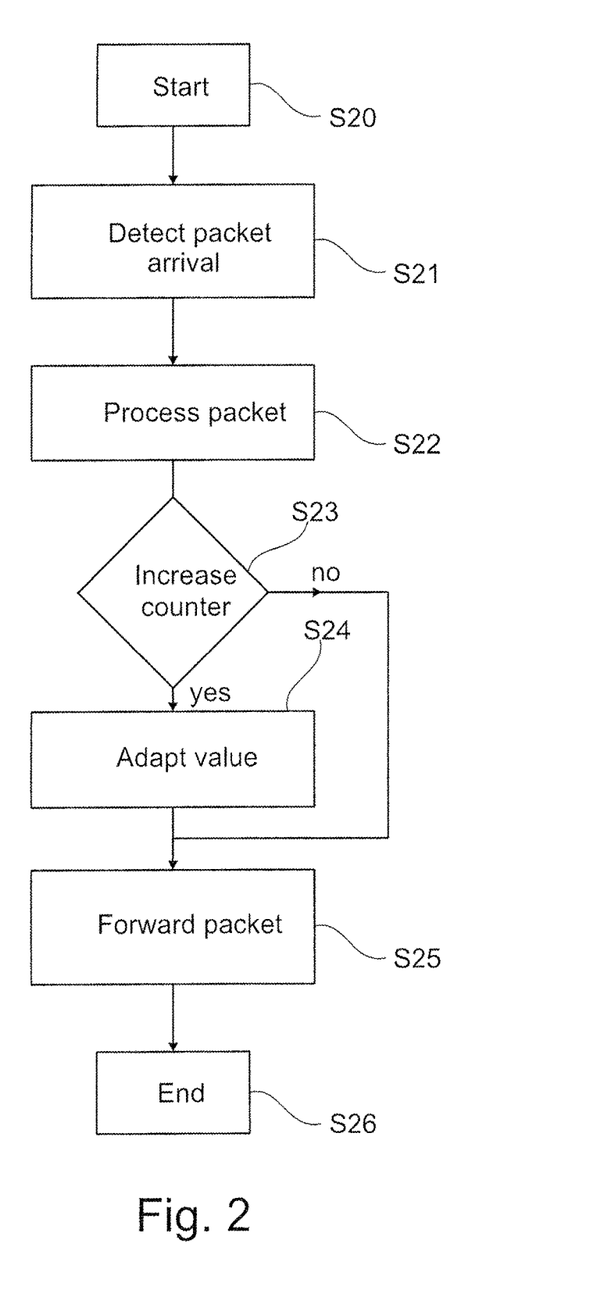
FIG. 2 illustrates an example of a flowchart comprising the steps carried out at a counting unit shown in FIG. 1 when a counting element is not increased for each arriving data packet.

FIG. 2 summarizes the step carried out in the counting unit comprising at least one processing unit and at least one memory with a counting element. The method starts at step S20 and at step S21 the arrival of the data packet is detected at the processing unit. In FIG. 1 the packet was received from a network interface card from where it was sent to one of the processing units 122-123. In step S22 the packet is processed and in step S23 it is then asked whether the counter should be increased. As described above, this can be done by generating a random number at the packet arrival, e.g. in step S21 and in step S23 this random number is compared with a predefined set of numbers. As it is determined in step S23 that the value in the counting element should be increased the value is adapted accordingly in step S24. By way of example as discussed above, the value may be increased by $Y/p_c$, in another embodiment however the value may be increased by Y as if all the number of packets were counted and only when the number is read from the counting element, the read number may be multiplied by $1/p_c$. In step S25, the packet is forwarded in direction of its destination. If it is determined in step S23 that the counter should not be increased, as the predefined probability $p_c$ is not met, the packet is directly forwarded without adapting the counting element. The method ends in step S26.

Figure 3:
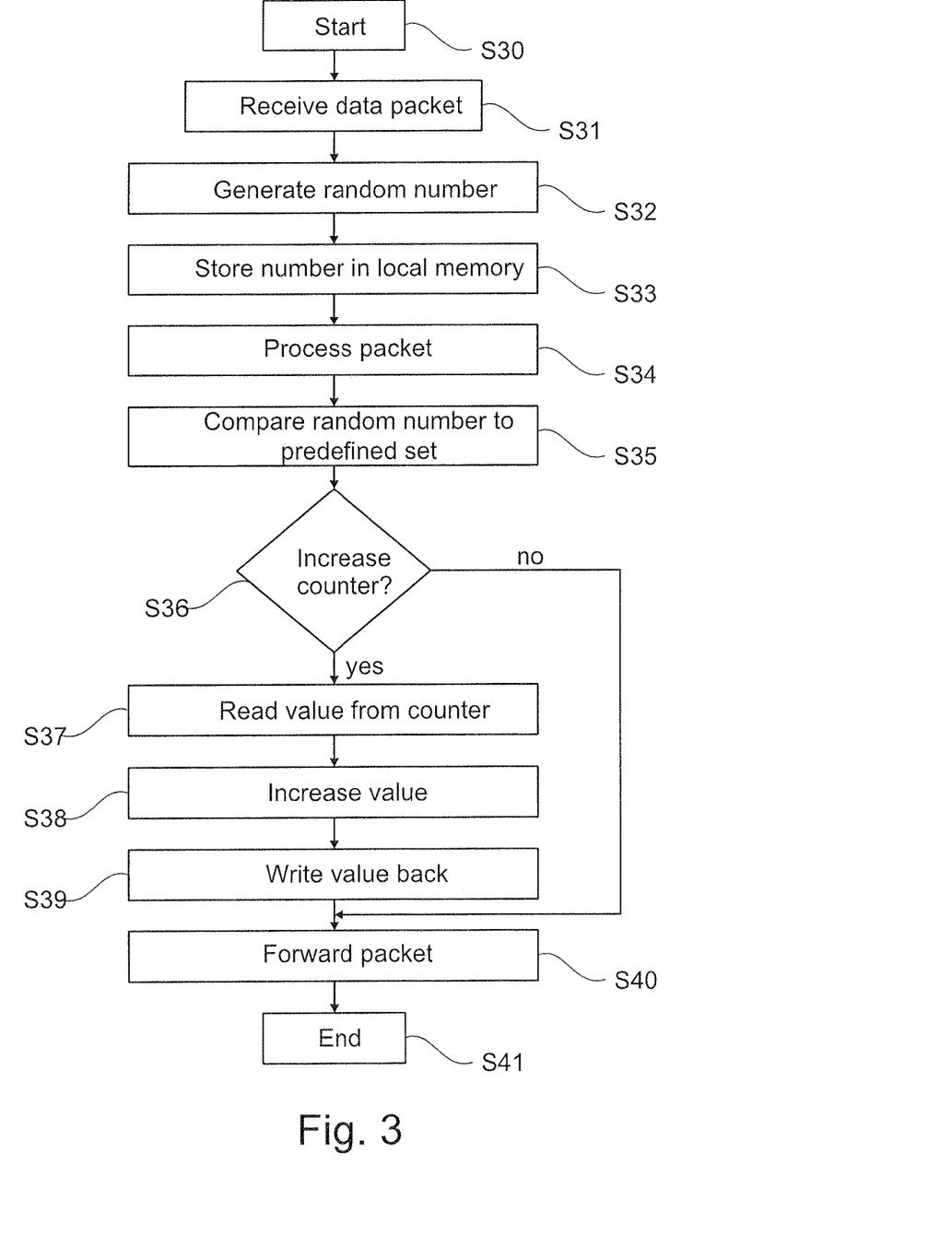
FIG. 3 shows an example of a more detailed flowchart carried out at a counting unit when not all the packets at the counting units are counted.

FIG. 3 describes a more detailed method carried out at a counting unit 100 shown in FIG. 1. The method starts in step S30 and, as in step S21, the packet is received in step S31. In the next step S32 a random number is generated for the arriving packet and it is stored in a local CPU memory (step S33) and the packet is processed in step S34. In step S35 the generated random number is compared to the predefined set of numbers wherein the random number corresponds to one of the numbers of the predefined set of numbers with a probability $p_c$. In step S36 it is checked whether the counter should be increased. Applied to the example above it is checked whether the generated random number corresponds to one of the numbers of the predefined set. If this is the case the current value of the counting element is read from the counting element in step S37, the value is increased in step S38 as needed, e.g. by increasing the value by $1/p_c$ or $Y/p_c$ and the newly determined value is written back in step S39. It is determined in step S36 that the value in the counting element should not be increased based on $p_c$, steps S37-S39 are not carried out and the packet is directly forwarded in step S40 without adapting the counter. The method ends in step S41.

Figure 4:
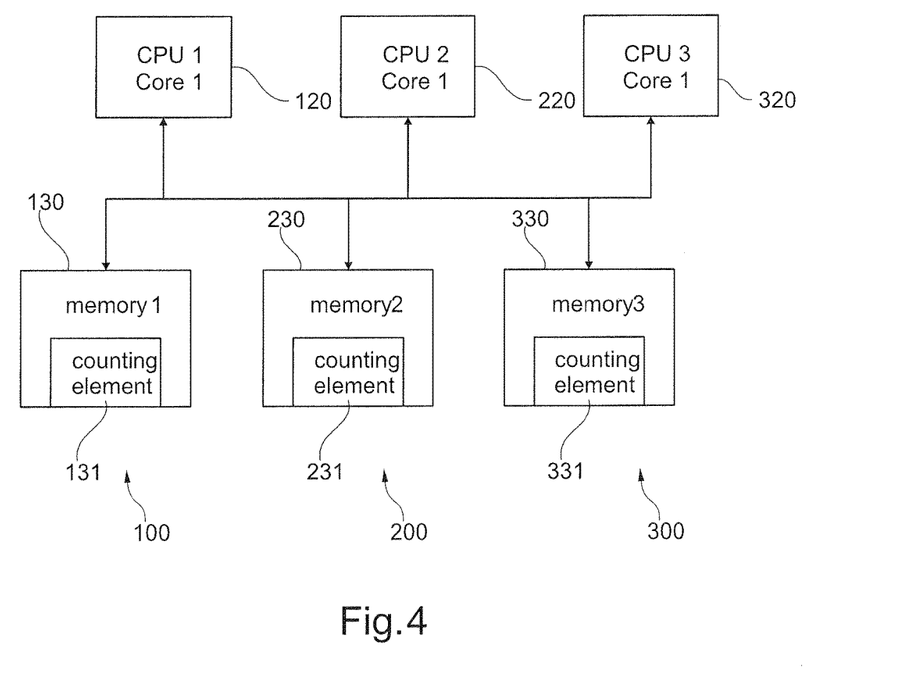
FIG. 4 shows an example of a detailed view of a system comprising a plurality of counting units as shown in FIG. 1.

In connection with FIG. 4 another embodiment is disclosed in which a plurality of counting units as shown in FIG. 1 are provided, e.g. the counting units 100, 200 and 300 wherein each counting unit comprises at least a processing unit with a memory and a corresponding counting element. The counting unit 200 also comprises a processing unit 220 with a memory 230 and a counting element 231 wherein a counting unit 300 comprises a processing unit 320, a memory 330 and a counting element 331. It should be understood that each of the processing unit 120, 220 or 330 can comprise more than one core. The other cores are not displayed for the sake of clarity. In such an embodiment, each counting unit 100-130 may use a different $p_c$ value for each counting element 131, 231, 331 so that it is decided for each counting unit independently if a packet increases a counting element or not. Although this decision only needs some very simple instructions such as the comparison even these simple instructions can be saved if the counting decision is done not for each counting element, but for a few set of counting units and in extreme cases the decision by one of the counting units can count for all other counting units. Thus, if a single processing unit 120, 220 or 330 decides to increase the value at its counting element, all the other counting elements could be increased. Furthermore, it is possible that instead of generating a random number for each packet, one of the processing unit generates a random number Q and the counting element is not increased for the next Q packets. The distribution of Q can be anything, even a fixed number. This embodiment needs one more counter which determines if the Q packets are well received. If however the random variable Q+1 has geometric distribution, exactly the same result is achieved as with selecting each packet for sampling one by one.

If the $p_c$ values of the different counting units do not differ which means that a packet increases either no counting element or all counting elements, the counting element may also be increased by Y and when the value of the counting element is read, it may be multiplied by $1/p_c$.

The accuracy of the counting units described above is important both for deciding about usability and the applications. Since the counting units can be considered separately, in the following, a single one is considered. Furthermore, it is supposed that the probability factor for an arriving packet to increase the counter $p_c$. Only those packets are considered which should increase the counter and let the value be Y1, Y2 ... YN, which is a random variable where N is the number of packets received until the counter value is read. It should be noted that these packets not necessarily belong to a single flow, but to a counting unit, e.g. a counter of an open flow table counts multiple flows. Furthermore, the packets need to be close to one another in time. By way of example, if a counter is counting different data traffic for a subscriber and it is read once a month, N is the number of packets of the subscriber during the whole month.

The term "value" is used for the counting element, since there can be different counting types. As described above, a counting element can either count the number of packets in which Y=1 or can be the length of the packet in bytes. It is supposed that these values are independent and have the same distribution. This may be slightly inaccurate for the packet length in some cases but since only the sum of these lengths are taken it is an acceptable approximation in long term e.g. to many packets.

Let $Z_1, Z_2, \ldots, Z_N$ be independent indicator random variables such that $P(Z_i=1)=p$. When $Z_i=1$, the $i^{th}$ packet is used to increase counters. The $X_i = Z_i * Y_i$ approximation for the counted value is $$R = \frac{\sum_{k=1}^{N} X_k}{p}$$

Using the central limit theorem, this R has normal distribution with mean $$ER = \frac{N * EX}{p} = N * EY$$

and variance $$\sigma^2 R = \frac{N * \sigma^2 Y}{p^2}$$

Note that the expected value is exactly what a non-randomized counter shows, i.e. (considering the normal distribution) it can be said that the estimation is not further away from the real value with more than $2*\sigma R$ at 95% confidence level. Thus, the "relative error" is $$\frac{2*\sigma R}{ER}$$

at the same confidence level. Suppose what is wanted is $$\frac{2*\sigma R}{ER} \leq z$$

With this assumption and with some further intermediate steps, the following formula is obtained:

$$p \geq \frac{4}{4+z^2 N} * \frac{E(Y^2)}{(EY)^2}$$

or another form $$p \geq \frac{4}{4+z^2 N} * \left( \frac{\sigma^2 Y}{(EY)^2} + 1 \right)$$

When only the number of packets is counted (i.e. Y=1), the situation is simple. Consider a very bad scenario, when the packets of a user are counted, who has a data traffic only about 100 MB in a month, i.e. considering 1500 bytes MTU supposes that N≈70000. Note that N is very low, this should be much higher for most of the counters, especially for those belonging to tables or ports. Moreover, pessimistically it is supposed that during the month the load is never low enough to count every packets. In this very unlikely case, for p=0.1 (i.e. decreasing the counting load to ⅒), the inaccuracy is 2.26%. On the other hand, if 10% inaccuracy is acceptable (z=0.1), p=0.0056, i.e. approximately every $176^{th}$ packet is counted.

The accuracy is a bit lower when bytes are counted. For this, a simple traffic model is used, where 55% of the packets is 100 bytes while 45% is 1500 bytes. Although this model is quite rough, it is not far from reality, and it is a serious overestimation when e.g. only the download traffic is counted. With this model, the result is different that $$\frac{E(Y^2)}{(EY)^2} \approx 1.91$$

i.e., at p=0.1, the inaccuracy is 3.2%, while at most 10% inaccuracy is obtained at p=0.010696 (every ~$93^{th}$ packet).

From the above said some general conclusions can be drawn. The counting unit may be configured to randomly assign a criteria to each data packet arriving at the processing unit and to check whether the randomly assigned criterion meets a predefined requirement, wherein the probability that the randomly assigned criterion meets the predefined requirement is $p_c$. The processing unit only increases the value at the counting element when the assigned criterion meets the predefined requirement.

In the above mentioned examples, the assigned criterion is a randomly assigned number and the defined requirement is a predefined set of numbers out of a predefined number range. In this embodiment, the processing unit may randomly assign a number out of the predefined number range to each data packet arriving at the processing unit and may then check whether the randomly assigned number corresponds to a number of a predefined set of numbers out of the predefined number range. Again the probability that the randomly assigned number corresponds to one number of the predefined number is $p_c$ and the processing unit only increases the value at the counting element when the randomly assigned number corresponds to one number of the predefined set of numbers.

Furthermore, when the processing unit determines to increase the value at the counting element, it may increase the value stored at the counting element by $Y/p_c$ with Y corresponding to the increase of the value at the counting element with $p_c=1$. In another embodiment, however, the value is increased by Y and every time the value of Y is read, the value may be multiplied by $1/p_c$.

The processing unit 120-123 may store the value in the counting element, such as counting element 131 of FIG. 1 through a transport element which may be the memory bus of FIG. 1 or which may be a memory controller when the random value is stored in a cache. The processing unit can determine a traffic load on the transport element and may adapt the probability $p_c$ independent on the determined traffic load. By way of example, when it is determined that a traffic load is below a predefined load threshold, the probability $p_c$ may be increased to 1 so that all packets are counted. In general, the probability $p_c$ may be set such that the higher the determined traffic load is, the lower the probability value $p_c$ will be set. By way of example, the randomly assigned number may be determined using a linear congruential generator as this element generates a random number with low computational effort. However, any other element able to generate a random number may be used.

As far as a system comprising a plurality of counting units is concerned when the processing unit of one of the counting elements generates a random number Q it counts each data packet arriving at the corresponding processing unit and the values at the counting elements of all the other counting units may not be increased for the next Q arriving packets and may only be increased when packet Q+1 arrives at the corresponding processing unit.

Furthermore it is possible that all processing units store the same probability value $p_c<1$ and the processing unit of one of the counting units determines to increase the values at all the other counting elements Y, Y corresponding to the increase of the value at the counting element with $p_c=1$. In this situation, each of the processing units of the system, when reading the value from the corresponding counting element, multiplies the value by $1/p_c$.

It should be understood that the exemplary structures illustrated in FIGS. 1 and 4 are only schematic illustrations. The memory 130 may include a read-only memory, a flash read-only memory, a random access memory, a mass storage or the like. Furthermore, the memory may include suitable program codes to be executed by the processing units 120 to 123 so as to implement the above described functionalities of a counting unit. In particular, the memory may include various program code modules for causing the counting unit to perform the steps discussed in more detail above, e.g. the steps shown in FIGS. 2 and 3. By way of example the memory may include a module for processing each data packet and a further module which determines whether the value at the counting elements should be increased each time the arrival of a counted packet is detected. Furthermore, a module may be provided to generate a random number and to compare the random number to a predefined set of numbers. Furthermore, a module may be provided to read the value from the counting element and write an increased value back into the counting element. It should be understood that the structure shown in FIGS. 1 and 4 are merely schematic and that the counting units may include further components, which for the sake of clarity have not been illustrated, e.g. further interfaces or processors.

Furthermore, the system may comprise means, each mean is configured to carry out at least one of the steps in which the counting unit is involved, e.g. the steps described above in connection with FIGS. 2 and 3.

As described above the present invention provides a possibility to decrease a memory access burden of a counting unit. This increases or improves a packet processing performance in general.

The invention claimed is:

1. A method of counting traffic events occurring at a processing element of a network node that is configured to receive and process data packet traffic, the method comprising:
   receiving individual data packets incoming to the processing element for processing;
   reducing internal transport accesses performed by the processing element for counting traffic events occurring at the processing element in association with processing the individual data packets, based on updating a traffic event counter only for a defined percentage of the traffic events; and
   approximating the actual number of traffic events based on:
      said updating of the traffic event counter comprising, for each update, accumulating a scaled count value that is scaled according to the defined percentage and directly represents the approximate number of actual traffic events; or
      said updating of the traffic event counter comprising, for each update, accumulating an unscaled count value, and determining the approximate number of actual traffic events by scaling the unscaled count value according to the defined percentage.

2. The method of claim 1, wherein the traffic events comprise data packet arrivals.

3. The method of claim 1, wherein updating the traffic event counter only for the defined percentage of the traffic events comprises, for each traffic event, updating the traffic event counter according to a selected probability.

4. The method of claim 3, wherein updating the traffic event counter according to the selected probability comprises, for each traffic event, generating a random number in a defined number range, and updating the traffic event counter only if the random number falls into a defined subrange of the defined number range, the defined subrange reflecting the defined percentage.

5. The method of claim 1, wherein updating the traffic event counter only for the defined percentage the traffic events comprises, for each traffic event, generating a random number within a defined numeric range via a linear congruent generator circuit local to the processing element, and updating the traffic event counter only if the random number falls within a subrange of the defined numeric range, said subrange reflecting the defined percentage.

6. The method of claim 1, wherein reducing the internal transport accesses performed by the processing element for counting the traffic events comprises reducing the number of memory bus accesses performed by the processing element, and wherein each update of the traffic event counter requires at least one memory bus access by the processing element.

7. The method of claim 1, further comprising adjusting the defined percentage in dependence on an internal load of the network node or the processing element, wherein the internal load increases or decreases in dependence on the volume of data packet traffic processed by the network node or the processing element, and wherein adjusting the defined percentage comprises at least one of:
setting the defined percentage to a predefined value less than one-hundred percent, in response to the internal load exceeding a defined upper threshold; and
setting the defined percentage to one-hundred percent, in response to the internal load being below a defined lower threshold.

8. The method of claim 7, wherein adjusting the defined percentage comprises setting the defined percentage to a selected percentage value from a predefined set of percentage values, in dependence on the internal load.

9. The method of claim 1, wherein the defined percentage is set according to a counting precision specified for each type of traffic event being counted, and wherein the method comprises updating a respective traffic event counter for each type of traffic event being counted by the processing element only for a respectively defined percentage of each type of traffic event.

10. A method of counting traffic events occurring at a processing element of a network node that is configured to receive and process data packet traffic, the method comprising:
receiving individual data packets incoming to the processing element for processing;
reducing internal transport accesses performed by the processing element for counting traffic events occurring at the processing element in association with processing the individual data packets, based on updating a traffic event counter only for a defined percentage of the traffic events; and
adjusting the defined percentage in dependence on an internal load of the network node or the processing element, the internal load varying in relation to the volume of data packet traffic processed by the network node or the processing element.

11. A network node configured to receive and process data packet traffic, the network node comprising:
interface circuitry configured to receive data packet traffic; and
processing circuitry operatively associated with the interface circuitry and arranged as at least one processing element configured to:
receive individual data packets for processing;
reduce internal transport accesses performed by the processing element for counting traffic events occurring at the processing element in association with processing the individual data packets, based on updating a traffic event counter only for a defined percentage of the traffic events; and
approximate the actual number of traffic events based on:
said updating of the traffic event counter comprising, for each update, accumulating a scaled count value that is scaled according to the defined percentage and directly represents the approximate number of actual traffic events; or
said updating of the traffic event counter comprising, for each update, accumulating an unscaled count value, and determining the approximate number of actual traffic events by scaling the unscaled count value according to the defined percentage.

12. The network node of claim 11, wherein the traffic events comprise data packet arrivals.

13. The network node of claim 11, wherein the processing element is configured to update the traffic event counter only for the defined percentage of the traffic events by, for each traffic event, updating the traffic event counter according to a selected probability.

14. The network node of claim 13, wherein the processing element is configured to update the traffic event counter according to the selected probability by, for each traffic event, generating a random number in a defined number range, and updating the traffic event counter only if the random number falls into a defined subrange of the defined number range, the defined subrange reflecting the defined percentage.

15. The network node of claim 11, wherein the processing element is configured to update the traffic event counter only for the defined percentage the traffic events by, for each traffic event, generating a random number within a defined numeric range via a linear congruent generator circuit local to the processing element, and updating the traffic event counter only if the random number falls within a subrange of the defined numeric range, said subrange reflecting the defined percentage.

16. The network node of claim 11, wherein the processing element is configured to reduce, as said internal transport accesses, the number of memory bus accesses performed by the processing element, where each update of the traffic event counter requires at least one memory bus access by the processing element.

17. The network node of claim 11, wherein the processing element is configured to adjust the defined percentage in dependence on an internal load of the network node or the processing element, wherein the internal load increases or decreases in dependence on the volume of data packet traffic processed by the network node or the processing element.

18. The network node of claim 17, wherein the processing element is configured to adjust the defined percentage by carrying out at least one of:
setting the defined percentage to a predefined value less than one-hundred percent, in response to the internal load exceeding a defined upper threshold; and
setting the defined percentage to one-hundred percent, in response to the internal load being below a defined lower threshold.

19. The network node of claim 17, wherein the processing element is configured to adjust the defined percentage by setting the defined percentage to a selected percentage value from a predefined set of percentage values, in dependence on the internal load.

20. The network node of claim 11, wherein the defined percentage is set according to a counting precision specified for each type of traffic event being counted, and wherein the processing element is configured to update a respective traffic event counter for each type of traffic event being counted by the processing element only for a respectively defined percentage of each type of traffic event.

21. A network node configured to receive and process data packet traffic, the network node comprising:
interface circuitry configured to receive data packet traffic; and
processing circuitry operatively associated with the interface circuitry and arranged as at least one processing element configured to:
receive individual data packets incoming to the processing element for processing;
reduce internal transport accesses performed by the processing element for counting traffic events occurring at the processing element in association with processing the individual data packets, based on updating a traffic event counter only for a defined percentage of the traffic events; and adjust the defined percentage in dependence on an internal load of the network node or the processing element, the internal load varying in relation to the volume of data packet traffic processed by the network node or the processing element.

* * * * *